United States Patent
Hartman et al.

(10) Patent No.: US 6,699,369 B1
(45) Date of Patent: Mar. 2, 2004

(54) APPARATUS AND METHOD FOR THERMAL DESALINATION BASED ON PRESSURIZED FORMATION AND EVAPORATION OF DROPLETS

(75) Inventors: William Francis Hartman, Albuquerque, NM (US); Larry Joe Kepley, Placitas, NM (US); Jerry Van Fox, Albuquerque, NM (US)

(73) Assignee: Aquasonics International, Albuquerque, NM (US)

( * ) Notice: Subject to any disclaimer, the term of this patent is extended or adjusted under 35 U.S.C. 154(b) by 0 days.

(21) Appl. No.: 09/927,172

(22) Filed: Aug. 10, 2001

(51) Int. Cl.⁷ .............................. B01D 1/14; B01D 1/18; B01D 3/00; C02F 1/04

(52) U.S. Cl. .......................... 203/11; 159/4.01; 159/4.1; 159/23; 159/16.1; 159/45; 159/48.1; 203/48; 203/49; 203/27; 203/90; 203/100; 203/DIG. 8; 203/DIG. 17; 210/737; 210/774; 95/214

(58) Field of Search .............................. 203/90, 49, 10, 203/11, 27, DIG. 17, 100, 48, DIG. 8; 159/4.01, 48.1, 4.04–4.09, 16.1, 4.1, 45, 23; 210/774, 807, 737, 718; 202/185.2, 236; 238/8, 13; 95/214

(56) References Cited

U.S. PATENT DOCUMENTS

| | | | |
|---|---|---|---|
| 909,460 A | * | 1/1909 | Schrade ..................... 159/4.04 |
| 2,887,390 A | * | 5/1959 | Coulter et al. .............. 426/588 |
| 2,957,519 A | * | 10/1960 | Walker ....................... 159/4.08 |
| 3,163,587 A | | 12/1964 | Champe |
| 3,243,359 A | | 3/1966 | Schmidt |
| 3,278,396 A | | 10/1966 | Parson |
| 3,557,863 A | | 1/1971 | Becker |
| 3,642,393 A | | 2/1972 | Ross et al. |
| 3,780,161 A | * | 12/1973 | Berquin et al. ............. 423/310 |
| 3,814,316 A | | 6/1974 | Stephanoff |
| 3,922,189 A | * | 11/1975 | Penders ..................... 159/4.02 |
| 4,104,112 A | * | 8/1978 | Stutz ......................... 159/4.01 |
| 4,200,497 A | | 4/1980 | Rhodes |
| 4,323,424 A | * | 4/1982 | Secunda et al. ........... 159/48.1 |
| 4,708,775 A | * | 11/1987 | McGregor et al. .......... 588/229 |
| 4,721,250 A | | 1/1988 | Kennedy et al. |
| 4,741,803 A | * | 5/1988 | Loeffelmann .............. 159/4.04 |
| 4,882,009 A | * | 11/1989 | Santoleri et al. ............ 159/4.2 |
| 4,953,694 A | * | 9/1990 | Hayashi et al. ............. 202/180 |
| 5,028,298 A | * | 7/1991 | Baba et al. ................. 159/31 |
| 5,135,611 A | * | 8/1992 | Cameron .................... 159/4.1 |
| 5,207,928 A | * | 5/1993 | Lerner ....................... 210/774 |
| 5,437,691 A | | 8/1995 | Lauterbach |

OTHER PUBLICATIONS

Robinson, R.N., PE, "Humidity Chart for Air and Water", *Chemical Engineering Reference Manual for the PE Exam*, 1996, 5ᵗʰ Edition, Professional Publications, Inc., Belmont, California.

* cited by examiner

*Primary Examiner*—Virginia Manoharan
(74) *Attorney, Agent, or Firm*—Dykema Gossett PLLC

(57) ABSTRACT

A method for removing dissolved solids, particularly salts, from water. An apparatus for performing the inventive method is disclosed. The aqueous solution to be treated, for example sea water, is atomized using special non-pneumatic nozzles, and sprayed into an evaporation chamber through which air, heated by waste heat, is blown. The microdroplets undergo rapid evaporation in the chamber, resulting in the separation of the salt solids from the vapor phase of the water. The mixture of suspended solids and water vapor is filtered to remove and collect the salts, and the water vapor is condensed to collect the salt-free water.

25 Claims, 2 Drawing Sheets

Figure 1:
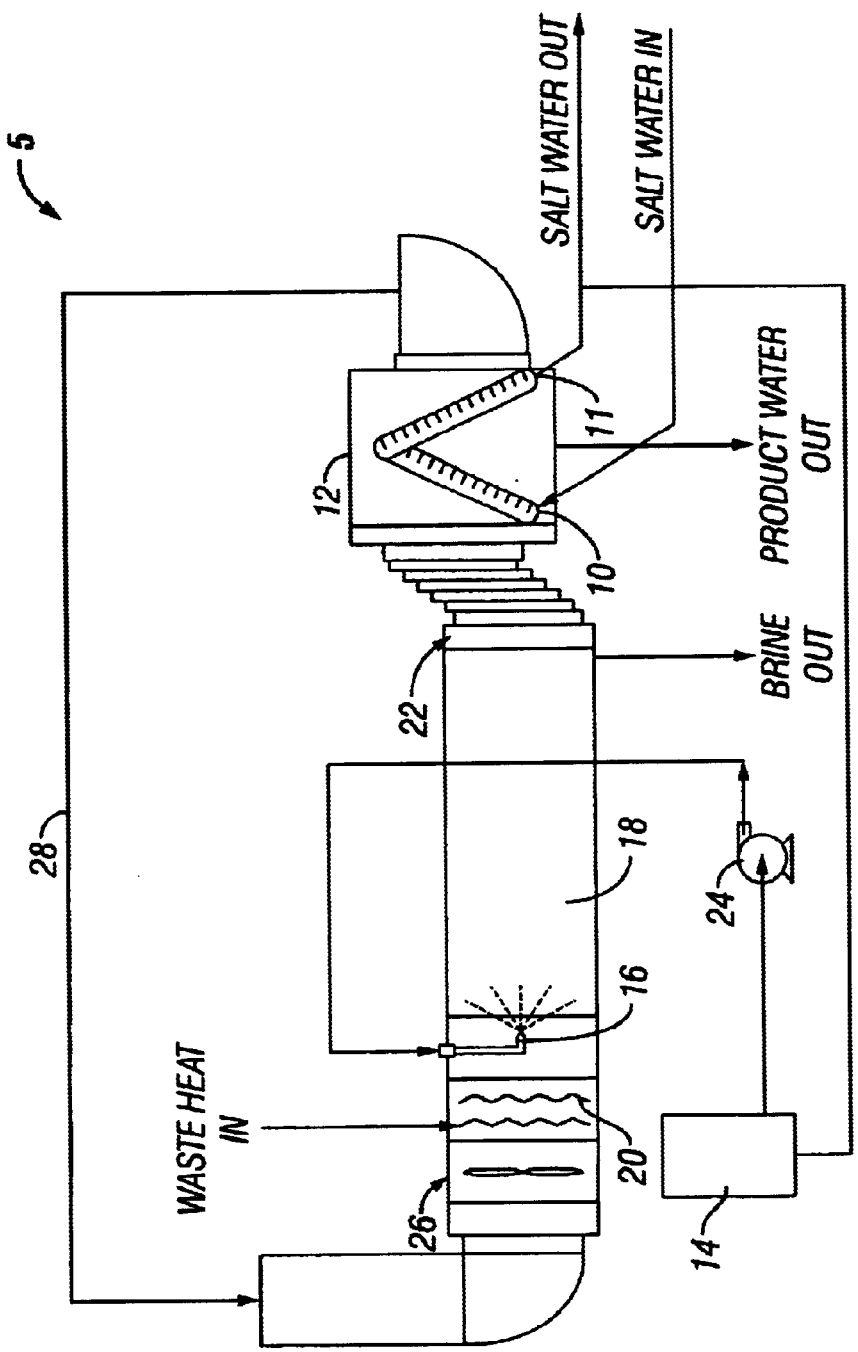
Figure 2:
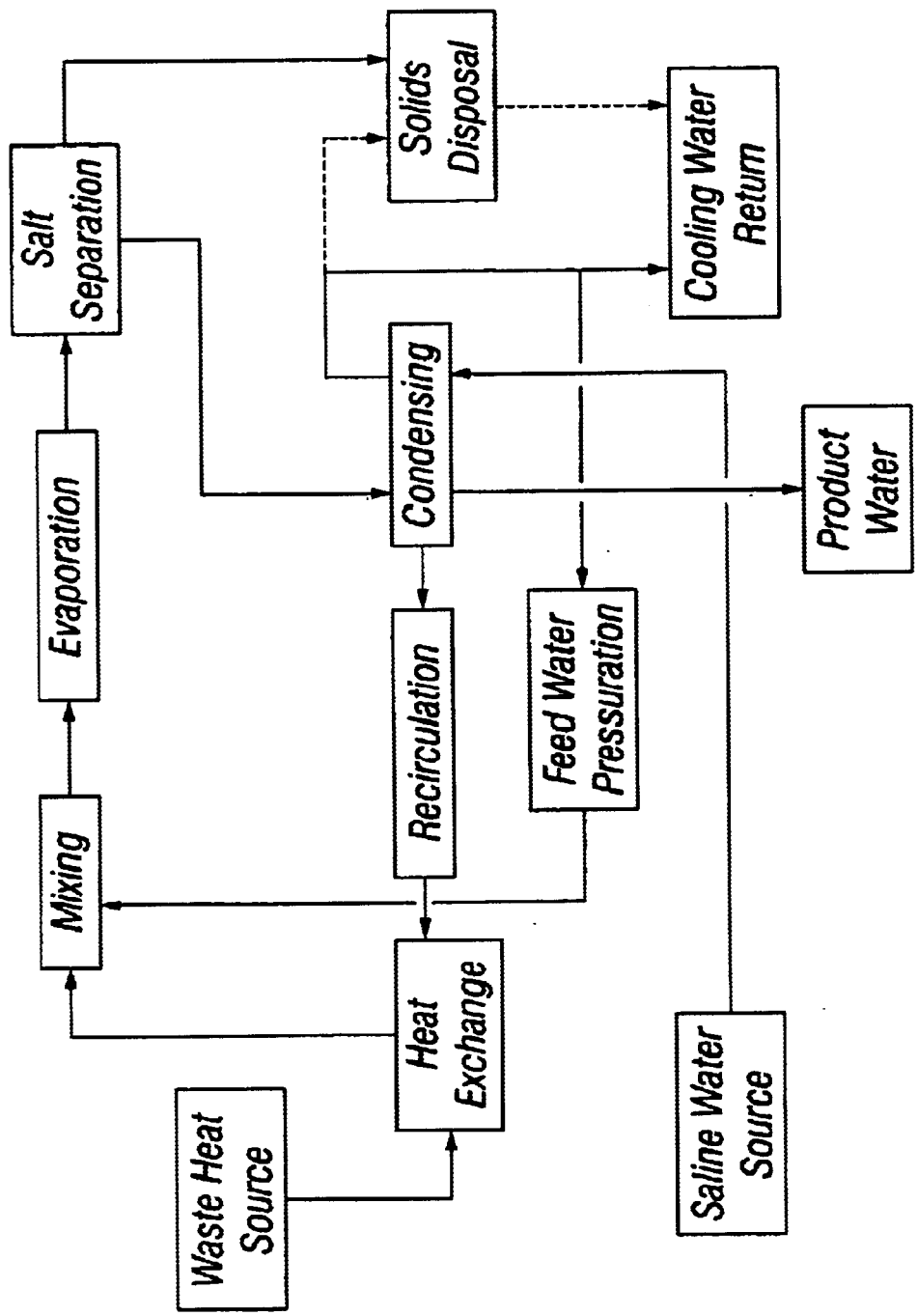

APPARATUS AND METHOD FOR THERMAL DESALINATION BASED ON PRESSURIZED FORMATION AND EVAPORATION OF DROPLETS

CROSS-REFERENCE TO RELATED APPLICATIONS

This application is related to, but does not depend from, U.S. patent application Ser. No. 09/369,067 now U.S. Pat. No. 6,299,735 to Lumbreras, filed Aug. 5, 1999, which is assigned to the assignee of this application, the disclosure of which is incorporated herein by reference.

BACKGROUND OF THE INVENTION

1. Field of the Invention (Technical Field)

The present invention relates to methods for separating solids from liquids, particularly to a method of desalinating water.

2. Background Art

Conventional methods of thermal desalination typically use distillation of seawater through a process of evaporating seawater and condensing the resulting water vapor, producing "salt-free" water. The most frequently encountered method of thermal desalination, commonly called "multi-stage flash," requires high temperatures, and operates from ambient (or elevated) pressures in the first stage to a high vacuum in the last stage, to effect temperature and pressure gradients for distillation and efficient heat utilization. The method produces desalinized product at only about 35% efficiency, meaning that only 35 gallons of distilled water results from every 100 gallons of input seawater. The multiple stages, pressures, vacuums, and low efficiency are economical barriers to wider use of the technology.

Other known desalinization processes involve the use of expensive reverse osmosis membranes to separate dissolved solids from water. The practicality, and popularity, of reverse osmosis membrane systems are hindered by the capital costs of RO membranes, as well as expense associated with RO membrane maintenance.

Representative patents from the desalinization field and serving as useful background to the present invention include U.S. Pat. No. 3,163,587 to Champe, U.S. Pat. No. 3,243,359 to Schmidt, U.S. Pat. No. 4,200,497 to Rhodes, and U.S. Pat. No. 3,642,393 to Ross et al. More recent disclosures in the field include U.S. Pat. No. 5,207,928 to Lerner, and U.S. Pat. No. 4,323,424 to Secunda et al.

A number of patents describe the separation of dissolved solids from liquids through the use of creating small droplets of the solution by rapid passage of the solution through a pneumatic nozzle, i.e., a nozzle which drives the solution spray primarily with a jet of compressed air blown into, or mixed with, a solution stream. The known pneumatic-nozzle methods typically atomize the solution in a chamber at ambient temperature and pressure. Although such methods can separate salt (sodium chloride, as well as other chemical salts such as potassium chloride) from seawater, large production rates have not been achieved or predicted at economical advantages. At ambient temperature, a large stream of droplets requires extremely large volumes of air and large chambers to effect complete evaporation. The prior apparatuses do not describe economical methods, and they employ methods of condensing that are economically unattractive, being costly to scale up to commercial levels of production. Furthermore, and importantly, creating droplets using compressed air requires excessive amounts of energy relative to other known methods of desalination.

It is known that atomizing the water into micron-size droplets significantly enhances their rate of evaporation. This method of solvent evaporation and dehydration of solids is often referred to as "fogging" when producing droplets less than 20 microns in diameter, and "misting" when using larger droplets. To the applicants' knowledge, however, none of the known methods or devices utilize fogging or misting, together with both waste heat over a range of temperatures and water collection upon cold-water condensers, to produce desalination under conditions that are economically attractive for commercial production of large quantities of fresh water from seawater.

A need remains for a desalination method that can accommodate a range of temperatures including lower temperatures such as those available from waste heat, is simple to construct and operate, does not require either large vacuum or pressure vessels, and yet can produce large volumes of product at high efficiency through the utilization of rapid evaporation and equilibration of droplets with vapor. Against this background, the present invention was developed.

SUMMARY OF THE INVENTION (DISCLOSURE OF THE INVENTION)

Broadly characterized, the present invention is of a method and apparatus for performing economical desalination, or the separation of water from dissolved solids, using available waste heat over a broad range of temperatures. The method includes the production of small droplets using hydraulic pressurization, the subsequent rapid evaporation of those droplets in a flow of air which has been heated through heat exchange with a waste heat source, followed by physical separation of the precipitating salt particles from the water vapor, and the condensing of the salt-free or nearly salt-free water vapor using a metal condenser cooled by the incoming seawater. The apparatus can be scaled up to appropriate sizes for achieving commercially desired production rates at economical costs. By the invention, recovery percentages, namely the percentage of processed feed water converted into fresh water, can exceed 90%. The invention does not require multiple boiler-condenser stages, vacuum production, the use of compressed air for atomizing, or specific high temperatures. Rather, it functions at low temperatures relative to conventional thermal methods of desalination and, consequently, should be less prone to scaling, fouling and corrosion.

The invention includes a method for removing and collecting water from dissolved salts in an aqueous solution comprising the steps of forcing the aqueous solution by hydraulic pressure through at least one non-pneumatic nozzle to produce droplets of aqueous solution, blowing a heated air stream through an evaporation chamber, dispersing the droplets into the heated air stream, permitting water in the droplets to evaporate, thereby separating water vapor from salt crystals in the heated air stream, filtering the heated air stream to remove the salt therefrom, and cooling the heated air stream to condense the water vapor. The step of forcing the aqueous solution preferably comprises pressurizing the solution to at least 400 psi. Also, the step of forcing the aqueous solution preferably comprises pumping the aqueous solution through a non-pneumatic nozzle orifice having a diameter of between about 0.006 inches and about 0.02 inches. "Forcing the aqueous solution" preferably comprises producing droplets of aqueous solution: having diameters less than about 100 microns, or more preferably comprises producing droplets of aqueous solution having diameters less than about 40 microns. The step of blowing hot air comprises blowing air having a temperature between approximately 180° F. and about 1000° F. The inventive method preferably further comprising the steps of collecting solid salt particles upon a filter, and periodically rinsing the filter to remove the salt.

Alternatively, the inventive desalinization process comprising the steps of pressurizing a saline solution preferably to between about 400 psi and about 1300 psi to force the solution through at least one non-pneumatic nozzle to produce solution droplets, blowing a heated air stream through an evaporation chamber, dispersing the droplets into the heated air stream, permitting water in the droplets to evaporate, thereby separating water vapor from salt in the heated air stream, filtering the heated air stream to remove the salt crystals therefrom, and cooling the heated air stream to condense the water vapor. In alternative embodiments, the solution may be pressurized to up to 3000 psi, or more preferably 2000 psi, using specially configured nozzles.

The step of pressurizing the solution comprises pumping the solution through a non-pneumatic nozzle orifice having a diameter of less than about 0.02 inches, preferably producing droplets of aqueous solution having diameters between about 1 micron and about 100 microns. The step of blowing hot air comprises blowing air having a temperature between approximately 180° F. and about 1000° F.

A primary object of the present invention is to remove salt and other chemical solids from a saline aqueous solution.

A primary advantage of the present invention is that, using waste heat, it desalinates water to potable quality at improved efficiencies of energy utilization, as compared to other thermal methods of desalination.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is a diagram showing the principal components of an apparatus according to the invention; and FIG. 2 is a chart illustrating the various steps of a preferred method according to the present invention.

DESCRIPTION OF THE PREFERRED EMBODIMENTS (BEST MODES FOR CARRYING OUT THE INVENTION)

The invention relates to a method and apparatus for separating dissolved solids from water, particularly the desalinization of water. A significant advantage of the invention is its efficiency. The invention may be practiced with low energy use, as energy is used to convey liquid and vapor, and with acceptable operating temperatures in a sufficiently wide range to allow the use of waste heat (e.g. industrial process exhaust) as the preferred source of evaporative energy. By employing hydraulic pressure alone to atomize the object liquid, rather than the energy-intensive process of pneumatically driving the atomization with a pressurized air jet, a significant energy saving is realized.

The invention also features the use of a filter to remove separated solids from the generated vapor stream. The invention employs a filter to separate clean water vapor from the brine mist in a compact, efficient manner—in distinction from many current methodologies employing multi-stages of kettles and condensers without intermediate filters, or which employ high-maintenance MSF and RO filtration devices.

The inventive apparatus and process offer a significant improvement over known multistage filtration methods and devices. The invention achieves salt-vapor separation in a single stage by combining physical atomization of the liquid solution into a mist and transport of the vapor through the physical barrier (filter) that blocks salt particles, rather than relying only on spatial separation between kettle and condenser. A limitation of multi-stage filtration methods is the deleterious effect on purity of streaming of mist across stages at lower temperatures and pressures. In the present invention, the process is compressed into one stage and one chamber, and using a filter to effect greater transport rates without salt transport to the condenser. The more compact process makes more efficient use of thermal energy, as compaction results in less energy loss from the system per pound of water desalinated.

Reference is made to FIG. 1, diagrammatically depicting some major components of an apparatus according to the invention. Saltwater enters the apparatus 5 at an inlet 10, from which water is conveyed to the condenser tubing within a conventional condenser 12. A portion of the saltwater exiting the condenser 12 is routed into the feed reservoir 14. A pump 24 pumps feed water from the feed reservoir 14, at pressures ranging from about 400 psi to about 1300 psi, through at least one and preferably a plurality of nozzles 16 (only one shown in FIG. 1). Each nozzle 16 preferably has an orifice diameter ranging from about 0.006 inches to about 0.02 inches. A suitable nozzle 16 is commercially available, for example, as nozzle any one of Model Nos. PJ-6, PJ-8, PJ-10, PJ-15, and PJ-20 sold by BETE Fog Nozzle, Inc., of Greenfield, Mass., USA. The resulting discharge through each nozzle 16 ranges from about 1 gallon per hour to about 20 gallons per hour (gph), depending on the orifice diameter. The foregoing pressure and nozzle diameter values are offered by way of example only, and are selected depending on the temperatures of the saltwater coolant and the waste heat utilized, as well as the desired production rate, in order to achieve efficient separation. Further, specially configured nozzles are available for use with high-pressure pumps that will permit the invention to be practiced at nozzle pressures of up to 2000 psi, or even up to 3000 psi, and alternative embodiments of the invention may be practiced at such elevated pressures.

The feed water exits the nozzles 16 in a rapid stream of ultrafine droplets. The droplets may range in diameter from approximately one micron to approximately one hundred microns. Droplets within this size range may be characterized as forming "fog" (primarily attributed to droplets less than 20 microns) and "mist" (droplets having diameters in excess of 20 microns). Because small droplets have increased surface area relative to their volume, compared to larger droplets and to pools of solution, heat transfer to the entire mass of the droplet occurs very quickly, because of spherical diffusion of heat.

The comparatively rapid heat transfer results in the rapid evaporation of the droplet. At constant relative humidity, the evaporation rate increases with increasing temperature. Given sufficient air mass flow, the droplets will fully evaporate over a short distance, e.g., several feet. The number of nozzles 16, together with their collective discharge of feed water (gph), determines the size of the evaporation chamber 18 and the required volume flow (cubic feet per minute (cfm)) of air to effect efficient evaporation over a specified distance. For a given temperature, if nozzles 16 having comparatively larger diameter orifices are employed, larger droplets are produced; and the larger droplets require more time to evaporate. Increased evaporation time dictates that the evaporation chamber 18 be longer in physical dimension, so that the residence time of a droplet in the chamber is increased to the time required for complete evaporation. In such a case, the evaporation chamber 18 can be configured with a vertical major axis, in order to avoid the droplets falling under gravity onto a horizontal surface and coalescing into a pool of saltwater.

The apparatus 5 of FIG. 1, by way of example, has one nozzle 16 depicted, such as a Model PJ-6 from BETE Fog Nozzle, Inc., having an orifice of 0.006 inches and permitting a discharge of 1.2 gph at a nozzle pressure of 500 psi. Circulating air is forced by blower 26 through the heat exchanger 20, resulting in air temperature at the location of the nozzle 16 of approximately 180° F. Importantly, the brackish or salty solution is forced through the nozzle 16 by hydraulic pressure only, without any supplemental pneumatic boost from an associated delivery of a compressed air stream. By obviating the use of a pneumatically assisted spray atomizer, the present invention dramatically improves the overall energy efficiency of the desalination process. The discharge velocity at the exit point of the nozzle 16 is preferably, but not necessarily, below sonic speeds. Suitable efficiency is obtained at ejection velocities ranging from about 20% to about 30% of sonic speed. Even at these ejection velocities, the solution is atomized to ultrafine droplets permitting the rapid droplet evaporation rates previously mentioned; although the method may be practiced successfully over a wide range of ejection speeds.

In this example, the airflow in the evaporation chamber 18 is approximately 102 ft/min, and the chamber has a cross sectional area of about 1.78 square feet (sf). Under these conditions, most droplets completely evaporate after less than two feet of travel in the evaporation chamber 18. The system can be optimized to make efficient use of the air temperatures achievable by using any available waste heat. Lower temperatures require more mass airflow and greater rates of coolant mass flow.

As a droplet completes the transition into water vapor, the contained solids precipitate in the form of small amorphous or crystalline particles. In the current invention, these particles (primarily salt) are trapped by a "salt barrier", which preferably consists of a washable, electrostatic particle filter 22 disposed between the evaporation chamber 18 and the condenser 12. The filter 22 permits the passage of vapor, but collects dry (or damp) salt particles, and can be periodically or continuously rinsed with feed water to create a concentrated brine. The brine can be removed as a saturated salt solution or salt slurry, and either further processed to dry and his refine the salt, or may be returned to the saltwater source (e.g. sea) as a diluted brine by being mixed with the salt water discharged from the outlet 11 of the condenser 12.

Significantly, the filter 22 is permitted to be wetted by the vapor stream; the use of a wet filter (fiberglass, fiber-reinforced paper, or the like) enables higher practical vapor levels to be achieved in a confined flow stream, which is advantageous to practical operation. Otherwise, significant cooling costs would be required to condense the vapor back into liquid form.

After passing through the salt barrier filter 22, the water vapor and air are directed to the condenser 12 where the water vapor condenses into fresh water. The fresh water may then be collected and removed from the apparatus 5 as "product water". The cooled air returns, as by a return duct 28 to the inlet of the heat exchanger 20 and the process continues. Given a specific temperature and mass flow rate of the water vapor, and given the humidity of the air, the size of the condenser 12 needed to effectuate condensing of the vapor can be calculated from standard formulas for any given temperature of seawater coolant.

The inventive apparatus and method are economically attractive because they may be "tuned" to take advantage of the available waste heat; that is, the temperature and volume of the waste heat, together with the temperature of the seawater, determine the necessary volume flow rates of air and coolant for a desired production rate. It is very preferred to employ the method to exploit available waste heat sources to provide the hot air stream for mixing with the atomized droplets. An advantage of the invention is that the method may be practiced over a wide range of operating temperatures, both the incoming temperature of the solution to be treated, as well as the temperature of the hot air stream introduced into the evaporation chamber. Consequently, the described method, which may be referred to as "Pressurized Spray Desalination" (PSD), can be incorporated into a desalination facility associated with any industrial plant having suitable waste heat. The waste heat is routed through a heat exchanger 20 to heat the air flowing in the PSD system. The required energy to operate the system and utilize the waste heat consists of the energy to circulate the air, the energy to pump the seawater for coolant and feed water, and the energy to produce the pressurized spray from the nozzles. In typical configurations of the inventive system, these energies, which are required to recover and utilize waste heat, add to a total required energy that is significantly less than the energies required for traditional thermal desalination processes. Therefore, not only can the subject system be adapted to a variety of waste-heat sources, it is also very energy efficient.

The inventive method is further described with combined reference to FIGS. 1 and 2. Feed solution is obtained from a saline water source, generally the ocean. The solution is conveyed through a line, as by gravity flow or by pumping, to the condensing unit 12 where a condensing step is performed. The saline solution absorbs heat from a comparatively warmer stream of air and water vapor flowing through a line leading from a separator filter 22 to the condenser 12. The saline solution stream, thus heated, is returned to the ocean via a discharge line and outlet.

The solution stream for the inventive process is a side stream that may be diverted from the discharge line. A feed water pressurization step is performed, wherein the aqueous solution is pressurized (e.g. with the pump 24), and then conveyed via an intermediate line to the evaporation chamber 18. The feed solution stream is injected, by hydraulic pressure, through spray nozzles 16 and into the evaporation chamber 18. By passing the solution through the nozzles 16, the solution is atomized into droplets having diameters preferably ranging from approximately 1 micron to approximately 40 microns. The atomized solution is dispersed by the nozzles 16 into the evaporation chamber 18.

A waste heat source (for example, turbine exhaust, or the exhaust from an unrelated manufacturing plant situated nearby) is employed to supply a heated fluid having a preferred temperature of from about 250° F. to about 700° F., to the heat exchanger 20 where a heat exchanging step occurs. Less preferably, the temperature of the heated fluid can range from about 180° F. possibly up to 1000° F. In the heat exchanger 20, a substantial fraction of the heat energy in the heated fluid is transferred to a recirculating, water saturated, air stream. (The heated fluid, reduced in temperature, may be either exhausted or returned to its source, depending upon the nature of the heated fluid and of the waste heat source.) The resulting hot air stream, having a temperature in the range of, for example, about 180° to about 700° F., is conveyed (e.g. by blower 26) to the evaporation chamber 18.

A mixing step takes place in the evaporation chamber 18. The hot air stream (resulting from the heat exchange step) and the water droplets (resulting from the forcing, by hydraulic pressure, of the solution through the nozzles 16) are intimately mixed through dispersion in the evaporation chamber. The nozzles operate non-pneumatically, i.e., without any pressurized air assist, which provides energy efficiency for the inventive process. The mixed hot air and solution droplets are moved, e.g. by blower 26, through the evaporation chamber, where evaporation of the water in the droplets is permitted to occur. The process steps of mixing and permitting evaporation both taking place within the chamber 18. Water thus is separated by evaporation from its contained salt content, the water vapor leaving behind damp or dry salt particles, which are prevented from entering the condenser by the filter 22. Alternatively, depending upon the balance of feed solution, circulating air, and heat source, the dispersed stream may be separated into an air-water vapor stream and a concentrated salt water stream.

Following evaporation, the mixture of water vapor and salt particles undergoes a salt separation step, where salt particles are filtered from the hot air and water-vapor stream. The separation preferably is by filtering, wherein the salt is collected on a filter medium 22. The nearly salt-free air and water-vapor stream flows to condenser 12 where the cooling condensing step occurs. In the condenser 12 the mixture of hot air and water vapor is cooled, generally to a temperature of about 75 to about 100° F., by heat exchange with the feed stream flowing from the saline or brackish water source as described above. Due to cooling, much of the water vapor is condensed and thereby separated from the saturated hot air stream flowing through the evaporation chamber 18. A recirculation step involves passing the hot air stream through fans or blowers 26 to provide the motive force for the overall circulating system. Product water, essentially salt-free, resulting from the condensing step then flows toward additional treatment (as required) for storage and use.

Salt solids, generally damp or dry particles, resulting from the salt separation step are conveyed to a solids disposal. For example, the filter 22 may be periodically rinsed to remove the crystals and transport them (perhaps in a dense brine) to appropriate disposal. The solids disposal step may involve further processing the salt for use as a by-product. Alternatively, the produced salts may be mixed with the heated stream of cooling water from the condenser 12 for return to the ocean as part of the cooling water return step.

In the case where the waste heat fluid is a gas that is normally exhausted to atmosphere, and the gas is suitable for contacting potable water, the hot waste gas may flow directly into the system at blower 26, and used to effect evaporation in chamber 18 without the need of the heat exchanger 20 and the return duct 28, both of which may be eliminated from the system. After passing through the condenser, the waste gas may be exhausted to atmosphere.

Thus, there is provided a method for removing dissolved salts from the aqueous feed solution, which method includes the steps of forcing the aqueous solution by hydraulic pressure through one or more non-pneumatic nozzles to produce droplets of aqueous solution, blowing an air stream, heated by waste heat, through an evaporation chamber and dispersing the droplets into the heated air stream, and then permitting water in the droplets to evaporate, thereby separating water vapor from salt in the heated air stream, and then filtering the heated air stream to remove the salt particles therefrom, followed by cooling the heated air stream to condense the water vapor.

The step of forcing the aqueous solution may involve pressurizing the solution to at least 400 psi, and pumping the aqueous solution through a non-pneumatic nozzle orifice having a diameter of between about 0.006 inches and about 0.02 inches. The step of forcing the aqueous solution preferably produces droplets of aqueous solution having diameters less than about 100 microns.

The step of blowing hot air may be blowing air preferably having a temperature between approximately 180° F. and about 700° F. Also included in the method are collecting the solid salt particles upon a filter, and periodically rinsing the filter to remove the salt.

Industrial Applicability:

The invention is further illustrated by the following non-limiting example, showing the total operating energy necessary to produce 100,000 gpd for a specific source of waste heat and a specific coolant temperature

EXAMPLE

It is assumed that the available waste-heat source provides for heated air at 250F. Requiring that the temperature of the air entering the heat exchanger, as well as the air exiting the condenser, is 100 F at 100%. relative humidity (RH), the enthalpy of the entering air accordingly is 62.8 BTU per pound of air. (Values used for enthalpy and humidity are taken from a "Humidity Chart for Air and Water" in "Chemical Engineering Reference Manual" 4th edition, by Randall Robinson, PE. The chart is based upon thermodynamic data for air and water, the latter from the Keneen and Keyes steam tables published in 1936.)

The heated air temperature is 250 F and the heated air enthalpy is 105 BTU per pound of air. The evaporation temperature, i.e., the temperature of the water vapor and air entering the condenser, is 123 F, at 90% RH.

The difference in humidity of the air entering the condenser (90%RH at 123 F) and exiting the condenser (100% RH at 100 F) is:

$$0.080-0.043=0.037 \text{ lbs of water per lb of dry air.}$$

The foregoing then enables the calculation of the mass airflow rate:

$$\text{Total pounds of dry air per day}=100{,}000 \text{ gal}\times 8.33 \text{ lbs/gal}/\ 0.037 \text{ lbs water per lb air}=22{,}513{,}514 \text{ pounds per day.}$$

At 14.3 cu ft per pound, this gives 223,572 cu ft per minute (cfm). Assuming that the efficiency of the process is 95%, that is, 95% of the feed water is converted into water vapor, then the horsepower to maintain this rate of airflow is:

$$\text{HP(airflow)}=0.000157\times\text{cfm}\times\text{pressure head/efficiency}=0.000157 \text{ HP/(cfm in)}\times 223{,}572 \text{ cfm}\times 2 \text{ in}/0.90=78.0 \text{ HP}=58.2 \text{ kW.}$$

The heat load on the condenser is equal to the difference in enthalpy between the air entering and the air leaving, that is, $$22{,}513{,}514 \text{ lbs air per day}/24 \text{ hours}\times(105-62.8) \text{ BTU per lb of air}=39{,}586{,}262 \text{ BTU per hour.}$$

The cooling water rate is the heat load divided by the heat gained per gallon of water:

Water rate=39,586,262 BTU per hour/(123−65−10)F/BTU per lb degree F/8.33 lbs per gallon/60 min per hour=1650 gal per min, for the case of 65 F cooling water and a 10 F approach to the entering air temperature.

From Cameron hydraulic tables, 1650 gpm in a schedule 40 18-in steel pipe requires 0.183 feet of head pressure drop per 100 feet. Assuming, for example, 2000 feet of pipe and 20 feet of pressure drop across the condenser and control devices:

HP(coolant)=1650×8.33 lbs/gal×(0.183×20+20) ft/33,000 ft lb/min=9.85 HP=7.3 kW.

The power required to operate all of the nozzles to produce the water droplets thus is calculated as follows:

HP (nozzle press.)=Pressure×flow rate=500 psi×144 si/sft×100,000 gpd×0.1337 cf/g/1440 min=668,500 lb ft min.

HP=668,500 lb ft/min/33,000 lb ft/min/0.90 HP=22.4 HP=16.8 kW. Adding the three calculated powers, the total power is: 58.2+7.3+16.8=82.3 kW. Calculating the total energy for 100,000 gallons, therefore, 82.3 kW×24 h=1975.2 kWh, or 19.75 kWk/1000 g, or 5.2 kWh/m$^3$.

Conventional thermal desalination methods require energy in the range of 10 kWh/m$^3$ to 30 kWh/m$^3$. The method according to the present invention accordingly uses significantly less energy than conventional thermal desalination methods.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by references.

What is claimed is:

1. A method for economically removing and collecting water from dissolved salts in an aqueous solation, said method comprising the steps of:
   supplying the aqueous solution to condenser tubing within a condenser;
   forcing a portion of the aqueous solution exiting the condenser only by hydraulic pressure through at least one non-pneumatic nozzle at a high pressure to produce droplets of aqueous solution;
   blowing a heated air stream through an evaporation chamber, said air stream being heated by waste heat;
   dispersing the droplets into the heated air stream;
   permitting water in the droplets to evaporate, thereby separating water vapor from salt crystals in the heated air stream;
   filtering the heated air stream to remove the salt therefrom; and
   cooling the heated air stream to condense the water vapor, wherein the aqueous solution absorbs heat from the heated air stream form said evaporation chamber and from the water vapor flowing from a filter to said condenser.

2. The method of claim 1 wherein the step of forcing the aqueous solution comprises pressurizing the solution to at least 400 psi.

3. The method of claim 1, wherein the step of forcing the aqueous solution comprises pumping the aqueous solution through a non-pneumatic nozzle orifice having a diameter of between about 0.006 inches and about 0.02 inches.

4. The method of claim 1 wherein the step of forcing the aqueous solution comprises producing droplets of aqueous solution having diameters less than about 100 microns.

5. The method of claim 1 wherein the step of forcing the aqueous solution comprises producing droplets of aqueous solution having diameters less than about 40 microns.

6. The method of claim 1 wherein the step of blowing heated air comprises blowing air having a temperature between approximately 180° F. and about 1000° F.

7. The method of claim 1 further comprising the steps of:
   collecting solid salt particles upon a said filter; and
   rinsing said filter to remove the salt particles.

8. An economical water desalinization method, said method comprising the steps of:
   supplying a saline solution to condenser tubing within a condenser;
   pressurizing a portion of the saline solution exiting the condenser to between about 400 psi and about 2000 psi to force the solution through at least one non-pneumatic nozzle to produce solution droplets;
   blowing a heated air stream through an evaporation chamber, said air stream being heated by waste heat;
   dispersing the droplets into the heated air stream;
   permitting water in the droplets to evaporate, thereby separating water vapor from salt in the heated air stream;
   filtering the heated air stream to remove salt crystals therefrom; and
   cooling the heated air stream to condense the water vapor, wherein the saline solution absorbs heat from the heated air stream from said evaporation chamber and from the water vapor flowing from a filter to said condenser.

9. The method of claim 8 wherein the step of pressurizing the solution comprises pumping the solution through a non-pneumatic nozzle orifice having a diameter of less than about 0.02 inches.

10. The method of claim 8 wherein the step of pressurizing the solution comprises producing droplets of aqueous solution having diameters between about 1 micron and about 100 microns.

11. The method of claim 8, the heated air having a temperature between approximately 180° F. and about 1000° F.

12. A method for economically removing dissolved salts from an aqueous solution, said method comprising the steps of:
   supplying the aqueous solution to condenser tubing within a condenser;
   forcing a portion of the aqueous solution exiting the condenser only by hydraulic pressure through at least one non-pneumatic nozzle at a high pressure to produce droplets of aqueous solution;
   heating air to a temperature of between about 250° F. and about 700° F.;

blowing the heated air to create an air stream through an evaporation chamber;

dispersing the droplets into the heated air stream;

evaporating the solution droplets to separate water vapor from salt crystals in the heated air stream;

filtering the heated air stream to remove the salt crystals therefrom; and condensing the water vapor in the heated air stream to produce water, wherein the aqueous solution absorbs heat from the heated air stream from said evaporation chamber and from the water vapor flowing from a filter to said condenser.

13. The method of claim 12 wherein the step of forcing the aqueous solution comprises pressurizing the solution to a pressure between approximately 400 psi and approximately 1300 psi.

14. The method of claim 13, wherein the step of forcing the aqueous solution comprises pumping the aqueous solution through a non-pneumatic nozzle orifice having a diameter of between about 0.006 inches and about 0.02 inches.

15. The method of claim 14 is wherein the step of forcing the aqueous solution comprises producing droplets of aqueous solution having diameters less than about 100 microns.

16. The method of claim 15 wherein the step of forcing the aqueous solution comprises producing droplets of aqueous solution having diameters less than about 40 microns.

17. The method of claim 16 wherein the step of blowing heated air comprises blowing air having a temperature of approximately 250° F.

18. The method of claim 17 further comprising the steps of:

collecting solid salt particles upon said filter; and rinsing said filter to remove the salt particles.

19. A method for economically removing and collecting water from dissolved salts in an aqueous solution, said method comprising the steps of:

supplying coolant to condenser tubing within a condenser;

forcing a portion of the aqueous solution only by hydraulic pressure through at least one non-pneumatic nozzle at a high pressure to produce droplets of aqueous solution;

blowing a heated air stream through an evaporation chamber, said air stream being heated by waste heat;

dispersing the droplets into the heated air stream;

permitting water in the droplets to evaporate, thereby separating water vapor from salt crystals in the heated air stream;

filtering the heated air stream to remove the salt therefrom; and cooling the heated air stream to condense the water vapor, wherein the coolant absorbs heat from the heated air stream from said evaporation chamber and from the water vapor flowing from a filter to said condenser.

20. The method of claim 19, wherein the step of forcing the aqueous solution comprises pressurizing the solution to at least 400 psi.

21. The method of claim 19, said non-pneumatic nozzle orifice having a diameter of between about 0.006 inches and about 0.02 inches.

22. The method of claim 19, wherein the step of forcing the aqueous solution comprises producing droplets of aqueous solution having diameters less than about 100 microns.

23. The method of claim 19, wherein the step of forcing the aqueous solution comprises producing droplets of aqueous solution having diameters less than about 40 microns.

24. The method of claim 19, wherein the step of blowing heated air comprises blowing air having a temperature between approximately 180° F. and about 1000° F.

25. The method of claim 19, further comprising the steps of:

collecting solid salt particles upon said filter; and rinsing said filter to remove the salt particles.

* * * * *